United States Patent
Butler et al.

(10) Patent No.: US 10,025,583 B2
(45) Date of Patent: Jul. 17, 2018

(54) MANAGING FIRMWARE UPGRADE FAILURES

(71) Applicant: International Business Machines Corporation, Armonk, NY (US)

(72) Inventors: Eric Kevin Butler, San Jose, CA (US); Thomas D. Griffin, Campbell, CA (US); Steven P. Gronefeld, Cumming, GA (US); Divyesh Jadav, San Jose, CA (US); William Anthony Sherrill, Winchester, KY (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 15/046,106

(22) Filed: Feb. 17, 2016

(65) Prior Publication Data

US 2017/0235561 A1    Aug. 17, 2017

(51) Int. Cl.
G06F 9/44       (2018.01)
G06F 8/65       (2018.01)

(52) U.S. Cl.
CPC ..................................... *G06F 8/65* (2013.01)

(58) Field of Classification Search
CPC ........................................... G06F 8/6165
USPC ............................................... 717/168–178
See application file for complete search history.

(56) References Cited

U.S. PATENT DOCUMENTS

| | | | |
|---|---|---|---|
| 6,640,334 B1 | 10/2003 | Rasmussen | |
| 7,085,957 B2 | 8/2006 | Sundareson et al. | |
| 7,509,636 B2 | 3/2009 | McGuire et al. | |
| 8,286,156 B2 | 10/2012 | Gavens et al. | |
| 2008/0201702 A1* | 8/2008 | Bunn | G06F 8/67 717/171 |
| 2010/0058313 A1* | 3/2010 | Hansmann | G06F 8/68 717/168 |
| 2011/0067005 A1* | 3/2011 | Bassin | G06F 11/008 717/127 |
| 2011/0107135 A1 | 5/2011 | Andrews et al. | |
| 2012/0239981 A1 | 9/2012 | Franke et al. | |
| 2012/0291021 A1 | 11/2012 | Banerjee et al. | |
| 2013/0179877 A1 | 7/2013 | Dain | |
| 2015/0058822 A1* | 2/2015 | Elias | G06F 8/71 717/123 |
| 2016/0033941 A1* | 2/2016 | T | G06F 8/65 700/81 |
| 2016/0055079 A1* | 2/2016 | Hanna | G06F 11/3692 717/135 |

(Continued)

Primary Examiner — Wei Zhen
Assistant Examiner — Binh Luu
(74) Attorney, Agent, or Firm — Ference & Associates LLC

(57) ABSTRACT

One embodiment provides a method of determining a revised firmware upgrade plan for one or more devices, said method including: utilizing at least one processor to execute computer code that performs the steps of: selecting, in view of a predetermined change window and risk associated with the firmware upgrade plan, a firmware upgrade plan; detecting a failure during execution of the firmware upgrade plan; and responsive to the detecting, identifying a revised firmware upgrade plan based on time remaining in the predetermined change window and risk associated with the revised firmware upgrade plan. Other aspects are described and claimed.

21 Claims, 9 Drawing Sheets

(56) References Cited

U.S. PATENT DOCUMENTS

2016/0343083 A1* 11/2016 Hering .................. G06Q 40/08
2016/0373478 A1* 12/2016 Doubleday ......... H04L 63/1433

* cited by examiner

429

Upgrade path tuple - Primary:
Initiator[OS, Mpath, FC Driver, ROM] Target(firmware)
Eg:, I:os1,v1{v2,v3,v4,v5}fc2,r3; T:fw1{fw2,fw3}

+

Upgrade path tuple(s) - Secondary: (connected devices)

=

*Minimal Intersecting set of compatible versions*

1. Does a global solution exist? Decreasing priority: Upgrade → Replicate the Upgrade → Replicate then replace
    a. Factors that effect choice include (but not limited to):
        - EOS asset in path, low / no confidence recovery plan, time constraints
2. Identify *Focus Device (FD) and Collateral Devices (CDs)*.
   FD U {CD} = (set of) *Connected Affected Entities (CAE)*.
3. Generate *Upgrade Path Tuples* for CAEs. Allocate *CWD*.
4. For each peer pair of Connected Affected Entities
    a. Generate *Historical Risk Matrix (HRM) & Estimate Time Matrix (ETM)*
    b. Using KB, eliminate incompatible versions from HRM and ETM
    c. Pick *Destination Firmware Level (DFL)* based on selection criteria, including, but not limited to:
        - Min-steps, min-time, min-risk
    d. Monitor progress against *Change Window Duration (CWD)*
    e. On ERR, retrace keeping *Projected time & risk* in mind for choices.
        - Re-try upto *CAFF* times.
    f. Update Knowledgebase *(KB)* with
        i   Time estimate to complete each successful step
        ii  Steps that failed - this will upgrade the risk profile of that step

FIG. 5

Historical Risk Matrix (HRM) — 610

|    | v1 | v2 | v3 | v4 | v5 |
|----|----|----|----|----|----|
| v1 | 0  | 2  | 5  | 4  | 5  |
| v2 | 2  | 0  | 4  | 3  | 6  |
| v3 | 2  | 6  | 0  | 2  | -  |
| v4 | 4  | -  | 6  | 0  | 3  |
| v5 | 6  | 4  | 8  | 2  | 0  |

FIG. 6A

Estimated Time Matrix (ETM)

|    | v1  | v2  | v3 | v4  | v5 |
|----|-----|-----|----|-----|----|
| v1 | 0   | 2   | 6  | 3.5 | 4  |
| v2 | 0.5 | 0   | 5  | 1   | 3  |
| v3 | 1   | 0.5 | 0  | 2   | 2  |
| v4 | 2   | 2   | 1  | 0   | 2  |
| v5 | 3   | 4   | 2  | 1   | 0  |

FIG. 6B

Historical Risk Matrix (HRM)

|    | v1 | v2 | v4 | v5 |
|----|----|----|----|----|
| v1 | 0  | 2  | 4  | 5  |
| v2 | 2  | 0  | 3  | 6  |
| v4 | 4  | -  | 0  | 3  |
| v5 | 6  | 4  | 2  | 0  |

FIG. 7A

Estimated Time Matrix (ETM)

|    | v1  | v2 | v4  | v5 |
|----|-----|----|-----|----|
| v1 | 0   | 2  | 3.5 | 4  |
| v2 | 0.5 | 0  | 1   | 3  |
| v4 | 2   | 2  | 0   | 2  |
| v5 | 3   | 4  | 1   | 0  |

FIG. 7B

MANAGING FIRMWARE UPGRADE FAILURES

BACKGROUND

Ongoing technological advances in the computer field, such as Gigabit Ethernet networks, converged Storage Area and IP-based networks (iSCSI, FCoE, etc.), tiered and flash-based storage arrays, multi-core and virtualized servers, have complicated the layout of a typical data center used to host applications and store and retrieve data for enterprises or individual consumers. Additionally, newer paradigms for accessing and manipulating data (e.g., millions of mobile devices, big-data analytics, and cloud computing) use constantly advancing technology infrastructure in new and complex ways. Further, storing data found in both private and public domains invites even greater scrutiny and oversight, resulting in additional regulatory mandates that permeate the entire life cycle of data creation and usage. These trends greatly complicate the task of monitoring and maintaining the IT (information technology) on which today's technology-driven society lives, works and plays.

BRIEF SUMMARY

In summary, one aspect of the invention provides a method of determining a revised firmware upgrade plan for one or more devices, said method comprising: utilizing at least one processor to execute computer code that performs the steps of: selecting, in view of a predetermined change window and risk associated with the firmware upgrade plan, a firmware upgrade plan; detecting a failure during execution of the firmware upgrade plan; and responsive to the detecting, identifying a revised firmware upgrade plan based on time remaining in the predetermined change window and risk associated with the revised firmware upgrade plan.

Another aspect of the invention provides an apparatus for determining a revised firmware upgrade plan for one or more devices, said apparatus comprising: at least one processor; and a computer readable storage medium having computer readable program code embodied therewith and executable by the at least one processor, the computer readable program code comprising: computer readable program code configured to select a firmware upgrade plan, in view of a predetermined change window and risk associated with the firmware upgrade plan; computer readable program code configured to detect a failure during execution of the firmware upgrade plan; and computer readable program code configured to be responsive to the detecting, identify a revised firmware upgrade plan based on time remaining in the predetermined change window and risk associated with the revised firmware upgrade plan.

An additional aspect of the invention provides a computer program product for a revised firmware upgrade plan for one or more devices, said computer program product comprising: a computer readable storage medium having computer readable program code embodied therewith, the computer readable program code comprising: computer readable program code configured to select a firmware upgrade plan, in view of a predetermined change window and risk associated with the firmware upgrade plan; computer readable program code configured to detect a failure during execution of the firmware upgrade plan; and computer readable program code configured to be responsive to the detecting, identify a revised firmware upgrade plan based on a time remaining of the predetermined change window and risk associated with the revised firmware upgrade plan.

A further aspect of the invention provides a method for computing a firmware upgrade plan that takes into account upgrade failures, comprising: dynamically computing at least one contingency plan when failures occur while performing a desired upgrade plan of a particular system under change window time constraints; and in light of the computed plans, recommending a plan that makes forward progress in said particular system even if the desired upgrade plan is unattainable in light of change window time remaining, in a failure scenario; wherein the at least one contingency plan is generated employing a family of algorithms that provide a spectrum of prioritization between historical estimates of upgrade action rise and upgrade time; wherein a particular weighting between risk and upgrade time can dynamically change at one or more of: (i) prior to starting the desired upgrade plan and (ii) when computing the at least one contingency plan, in the failure scenario; and wherein the spectrum of prioritization is determined using one of: a linear combination of risk and time estimates and a product of risk and time estimates.

An even further aspect of the invention provides a method for computing a firmware upgrade plan that analyzes feasible solutions, historical risk, and time estimates of similar upgrades, comprising: determining a degree of risk of an update to a target device due to at least one of: (i) firmware of the target device being at end of support, (ii) the target device being at end-of-life, and (iii) intermediate firmware states being states of no return; and in light of the determining, recommending to a user an upgrade strategy selected from the group consisting of: (i) upgrade device in place, (ii) replicate data, then upgrade device, and (iii) replicate data, then replace device.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 provides an example of upgrade path tuples.

FIG. 5 provides a sample algorithm as applied to connected affected entities in an upgrade process.

FIG. 6A provides an example Historical Risk Matrix.

FIG. 6B provides an example Estimated Time Matrix.

FIG. 7A provides an example modified Historical Risk Matrix.

FIG. 7B provides an example modified Estimated Time Matrix.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to the figures. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an exemplary embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Figure 1:
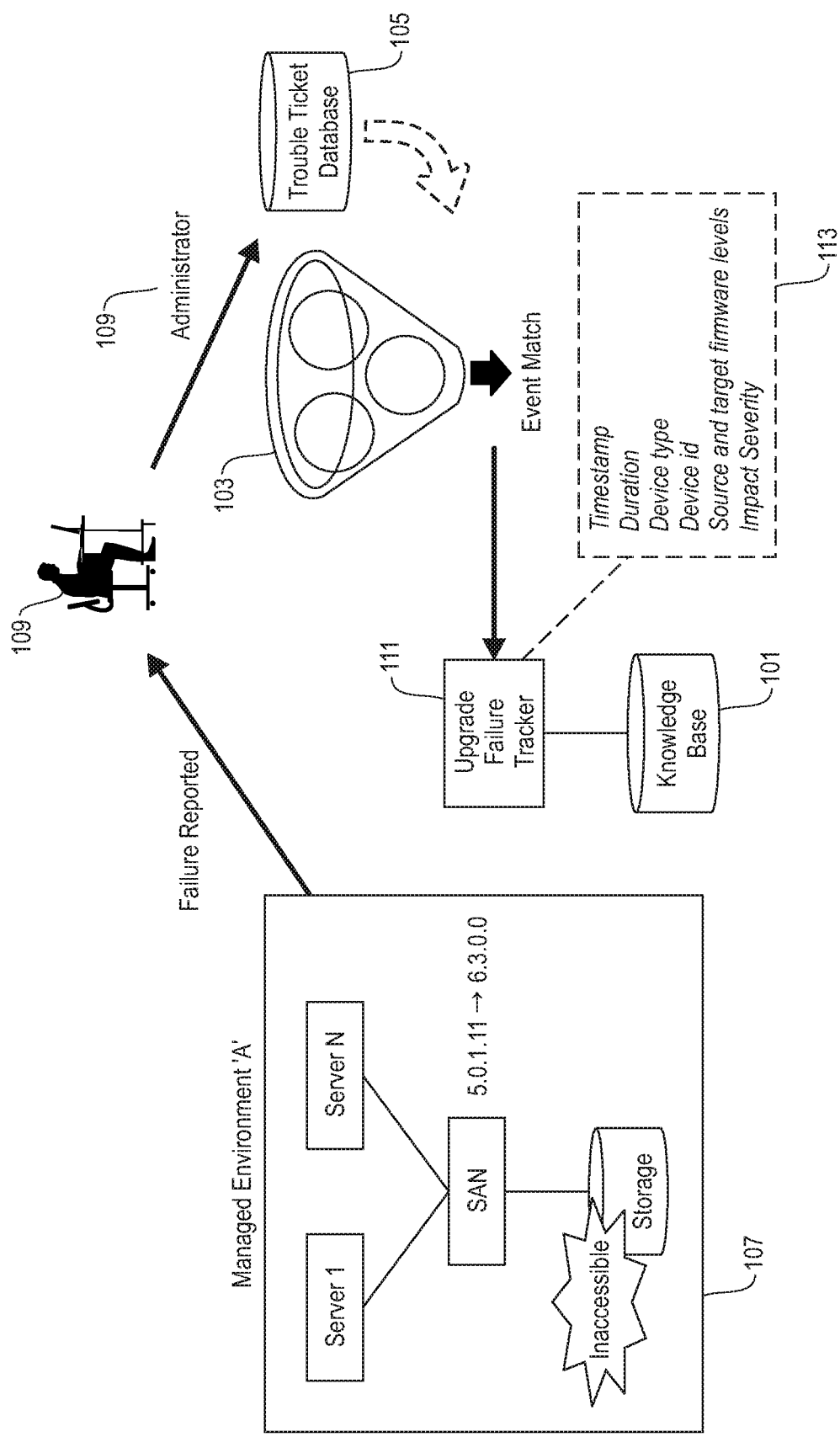
FIG. 1 schematically illustrates a manner of capturing history in a knowledge base.

To facilitate easier reference, in advancing from FIG. 1 to and through FIG. 5, a reference numeral is advanced by a multiple of 100 in indicating a substantially similar or analogous component or element with respect to at least one component or element found in at least one earlier figure among FIGS. 1-5.

Broadly contemplated herein, in accordance with at least one embodiment of the invention, are methods and arrangements for computing a firmware upgrade plan that takes into account upgrade failures, comprising: dynamically computing one or more contingency upgrade plans when failures occur while in the middle of an upgrade plan of a particular system, under change window time constraints; and in light of the computed plans, recommending a plan that makes forward progress in the system even if the desired eventual firmware state is not attainable in light of a change window time that may remain in a failure scenario. This can involve the contingency plans being generated via employing a family of algorithms that provides a spectrum of prioritization between historical estimates of upgrade action risk and upgrade time, wherein the particular weighting between risk and upgrade time can dynamically change both (i) prior to starting the upgrade, and (ii) when computing the next step(s), when a failure does occur during an upgrade step. The prioritization can be undertaken by choosing an instance of a linear combination or a product of risk and time estimates.

Moreover, in accordance with at least one embodiment of the invention, there are broadly contemplated herein methods and arrangements for computing a firmware upgrade plan via analyzing feasible solutions and historical risk and time estimates of similar upgrades, comprising: determining a degree of risk of an update to a target device due to (i) its firmware being at its end-of-support, (ii) the device being at its end-of-life, and/or (iii) intermediate or eventual firmware states being states of no return; and in light of such determination, recommending to the user an upgrade strategy of: (a) upgrade the device in place; or (b) replicate data, then upgrade the device; or (c) replicate data then replace the device.

The features discussed above, and others, relating to at least one embodiment of the invention, will be better appreciated from the discussion which follows.

In accordance with a general background relative to at least one embodiment of the invention, it has become apparent that ensuring the "RAS"—Reliability, Availability, and Serviceability—of IT infrastructure inside a modern data center is a highly challenging task, growing ever more difficult with each new class of device and paradigm of data manipulation. As such, a typical data center includes many different layers, such as: inbound network connection, firewall, network load balancing layer, web servers, IP fabric, application servers, SAN fabric, and storage arrays. A layer can contain both physical devices (e.g., servers, hypervisors, switches, storage arrays, etc.) and/or virtual devices (e.g., Software Defined Network [SDN] IP switches, virtual machines, storage virtualizers, etc.), each with its own set of management challenges.

It can be appreciated, in a general context of at least one embodiment of the invention, that physical devices typically run some software to operate normally; for instance, a server typically runs an operating system (OS). As such, a server's OS is a fairly well understood entity with respect to its name, features, and version. However, proceeding deeper into the stack, the software engine that governs a device's normal and failure mode behavior tends to become more opaque and less understood, running closer to the hardware, and becoming more specialized in nature. Examples of such software entities include (but by no means are limited to): Fiber Channel (FC) Host Bus Adapter (HBA) drivers, ROM embedded software, multi-pathing drivers, license machine code, and bundle level, etc. These software entities are often referred to as "firmware" or "microcode", and the device manufacturer continually releases new firmware versions due to the advent of new features, support for newer hardware and software platforms, and bug fixes.

It can thus be appreciated, in a general context of at least one embodiment of the invention, that a central implication of requiring the applications and services provided by a data center to be available on a constant basis is that the underlying hardware must be up and available constantly. Data center design typically builds in redundancy so that if an individual application and/or hardware fails, the redundant portion can still provide services regardless. However, this redundancy comes at a price, requiring extra hardware and specialized software.

Additionally, putting aside redundancy, service availability tends to require that the ensemble of hardware and software providing a service be compatible with each neighboring layer of a stack, at all times. In the case of hardware, this implies that disk drive firmware be compatible with Fiber Channel (FC) Host Bust Adapter (HBA) drivers, which need to be compatible with the firmware of the storage device and/or server they are housed in, as well as the FC switch port driver firmware. In the case of hardware, this implies that disk drive firmware be compatible with storage controller storage interfaces, which need to be compatible with the firmware of the storage management system of the device and/or server they are housed in, as well as the internal storage switch port driver firmware.

Furthermore the storage network interface network driver of the storage controller needs to be compatible with the server/host storage HBA firmware and OS driver from which the server is using storage resources. Inasmuch as these considerations define a path from a networked disk drive to a server, with a new cycle (via a downward traversal from the server) or cycles easily starting from the server side, it can be appreciated that compatibility needs to be maintained both in steady state, as well as after a firmware upgrade at any device in the stack. As such, it can be appreciated that firmware currency management in a data center can be a very challenging task. In particular, because of high fan-out, the potential to impact a multitude of applications and services, and criticality of purpose, it becomes a very complex challenge to ensure availability of the storage layer, and by implication, effective storage firmware management.

It can be recognized that, due to the importance of firmware management within a data center, organizations typically have teams that closely track device firmware. Typical functions performed by such teams include (but need not be limited to): inventory collection; documenting best practices; testing newly released firmware levels; receiving or publishing recommended firmware levels; subscribing to interoperability labs and their publications and advisories; monitoring vendors for firmware advisories, warnings and recommendations; identifying devices that need to have their firmware upgraded; negotiating change windows; designing upgrade plans, and executing such plans. A major complication in this task set is that different layers of the data centers typically have dedicated teams that manage the devices in that layer; for example, there may be a distinct server team and a distinct storage team. Typically, the teams work in their own "silos" of responsibility, and do not have an end-to-end view of the environment or the processes used to manage the environment. Finally, it is conventional, in data centers and the organizations that operate them, to use processes (e.g., spreadsheets and email) that involve a high degree of human interaction and effort. While there are some products that can assist in one or more areas of a firmware management problem, conventionally it is not characteristic to address the firmware lifecycle problem across the entire stack.

It can be recognized that it is possible to examine interconnections among devices as part of determining whether a device with an upgraded firmware version would be compatible with connected devices. This approach is a brute-force approach, as it does not address a future course of action when errors occur during an upgrade cycle, nor does it take into account constraints imposed by change windows. Further, while this approach examines candidates for new firmware levels based on availability by version, it does not draw upon past history to pick a new firmware level to upgrade a device needing an upgrade, in terms of either risk associated with upgrading to the new level, or the estimated time for performing such an upgrade.

Broadly contemplated herein, in accordance with at least one embodiment of the invention, are methods and arrangements which provide a holistic view of the firmware upgrade lifecycle, and provide risk mitigation and flexible recovery when deviations occur from an upgrade plan. Inasmuch as failures may occur during an upgrade process, these are anticipated and recovery is pre-computed by way of making initial, "forward" progress with respect to an upgrade, and within time constraints that may exist in a remaining time window. "Forward progress" can be regarded here as arrival at an end state that comes as close to the target state as possible, wherein this end state represents an improvement over a starting state.

It will be appreciated herein that methods and arrangements according to at least one embodiment of the invention overcome, avoid or mitigate shortcomings of conventional efforts at governing a firmware upgrade lifecycle. Such shortcomings include, but by no means are limited to: an inability to anticipate failures or to prescribe alternate upgrade paths when failures do occur; not taking into account incomplete or inconsistent execution of an upgrade plan; not taking into account change window constraints; and limited or ineffective mitigation when upgrade failures occur, e.g., via merely rolling back to a starting point.

In accordance with at least one embodiment of the invention, multiple "incomplete what-If" upgrade scenarios are contemplated, wherein a prospective recovery plan is generated for each incomplete or failed upgrade scenario. Further, prior knowledge is combined with data for a present scenario to minimize availability outages due to upgrade failures. Additionally, the user is provided with a continuum of choices for prioritizing upgrade risk against upgrade time, and further given a dynamic redistribution of the prioritization, depending on the progress towards completion of the overall upgrade plan with respect to a time window constraint. When failures occur, rolling back to the starting point becomes a "last resort", in that plans are generally designed to make forward progress toward a satisfactory end state of firmware upgrade. Again, "forward progress" implies that one arrives at an end state that comes as close to the identified target state as is possible, wherein the end state represents an improvement over the starting state. This will be better appreciated from the ensuing discussion.

Broadly contemplated herein, in accordance with at least one embodiment of the invention, is the use of a knowledge base (KB) and an analytics engine, which also may be termed an "upgrade concierge" (UC). The KB, among other things, can capture history and store other configurable parameters, while the UC can generate static upgrade plans as well as dynamic recovery plans for when failures occur; all such plans can be guided by change window constraints.

In accordance with at least one embodiment of the invention, FIG. 1 schematically illustrates a manner of history capture in the KB. Here, the KB 101 is fronted by a filter daemon 103 that plugs into a trouble ticket process, particularly into a database (105) being used therefor. As such, the daemon scans trouble tickets in database 105 for failures reported from the field (e.g., from a managed environment "A", 107, as relayed to an administrator 109). The daemon 103 acts as an "event match" component and thus fires in particular when detecting a firmware upgrade or incompatibility problem. Upon firing, it connects with a component referred to as the upgrade failure tracker 111, which records pertinent information (113) that can include, but is not necessarily limited to: timestamp of event; device identifier (e.g., machine type, model, serial number, IP address etc.); source and target firmware level; and impact duration and severity. Such data are then stored in the KB 101. As such, the KB 101 represents a continuously updated repository that serves to aggregate detailed information about firmware upgrade failures in the field, and is used at run-time.

Figure 2:
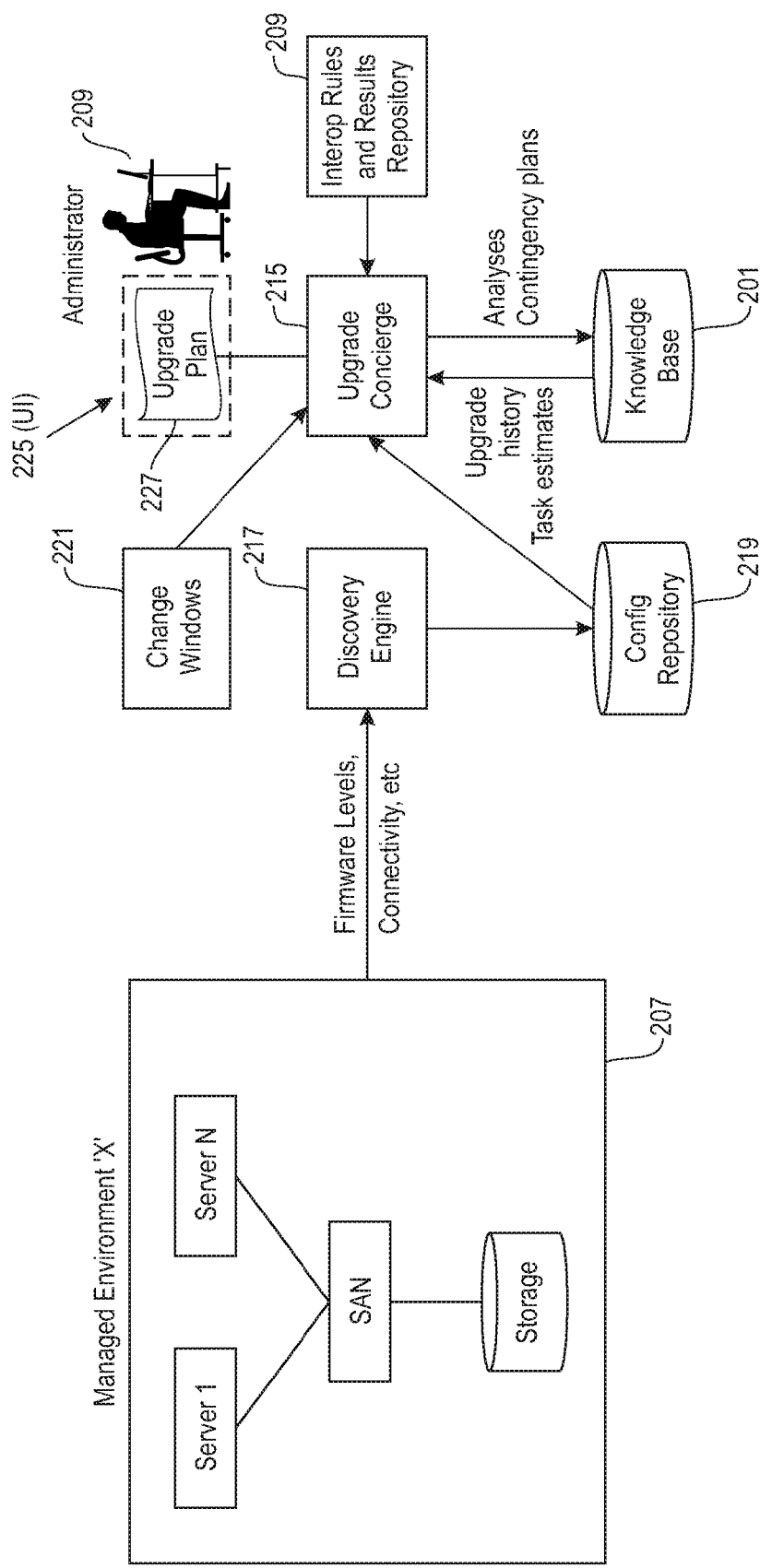
FIG. 2 schematically illustrates a system architecture incorporating an upgrade concierge.

In accordance with at least one embodiment of the invention, FIG. 2 schematically illustrates a system architecture incorporating a UC 215. As such, the UC 215 is connected to several components that can include (but need not be limited to): a discovery engine 217 (e.g., IBM TPC/TADDM/IEM, EMC Control Center, VMware Application Discovery Manager, custom scripts, etc.) which periodically scans the managed environment for device inventory and firmware levels and stores such data in a persistent configuration repository (CR) 219; a change window specification system 221; repositories or feeds for interoperability rules and/or results (e.g., IBM's Storage Systems Interoperability Center) 223; a KB 201 (e.g., as described heretofore with respect to FIG. 1) and a user interface (UI) 225 (e.g., as may be employed by an administrator 209).

In accordance with at least one embodiment of the invention, the UC 215 reads the CR 219, mines change window constraints from the change window sources 221, and queries the KB 201 and the interoperability service 223 to: identify devices (e.g., in a managed environment 207) that need their firmware changed; generate one or more prioritized upgrade plans (227) for such devices (e.g., that can be displayed to administrator 209 via UI 225); and generate and store (e.g., in KB 201) minimal downtime and contingency risk mitigation plans for when upgrade failures occur. Furthermore, once an overall upgrade process starts, the UC 215 closely monitors and tracks the process, and continuously prunes and refines the sub-plans.

In accordance with at least one embodiment of the invention, the UC 215 periodically examines devices in its inventory and identifies those that need to be attended to (for example, if they have stale firmware). This periodicity is user-configurable, with a predetermined default (e.g., daily). This analysis can also be kicked off on demand by the administrator 209 from the UI 225. Having identified that a device needs to be attended to, the UC 215 then sets about generating an upgrade plan (227).

One higher-level decision that can be made by a UC 215, in accordance with at least one embodiment of the invention, is whether there is a global solution to the upgrade problem at hand. This decision can be reached using essentially any suitable approach, such as a brute-force approach discussed herein. As such, assuming a global solution exists, there is broadly contemplated herein a prioritization of a form of the upgrade in decreasing order of priority: (1) upgrade device; (2) replicate data, then upgrade device; and (3) replicate data, then replace device. The KB 201 is used to distinguish among these routes. Though not a restrictive manner of choosing, a straight upgrade (1) may be regarded as a preferred route. This can be the route chosen if there is prior history in the KB 201 about other devices of comparable age that have the same installed firmware level as the device under consideration, or if there no such prior history but the device under consideration is running a firmware version/level above the minimum required or recommended for that type of device. Otherwise, more conservative approaches as listed under (2) and (3) may be chosen. Factors that affect the choice include, but are not limited to: antiquated to end-of-service (EOS) device in path; low or no-confidence recovery plan; and/or time constraints. Assuming there is a feasible upgrade plan, the process may then proceed as discussed herebelow.

In accordance with at least one embodiment of the invention, another higher-level decision made by the UC 215 is to identify steps that can proceed in parallel and those that would need to proceed serially. Typically, devices that are of the same type and are connected to the same type of device (example, Windows x86 servers connected to an IBM DS8800 storage array) can be upgraded in parallel, and devices at different layers can be upgraded serially (by way of example, servers first, then SAN switches). It will be appreciated from the ensuing discussion that advantages are gained in connection with either of these parallel or serial steps. As such, the UC 215 avoids upgrade conflicts by ensuring that a given device is involved in only a single upgrade plan at a point in time.

Figure 3:
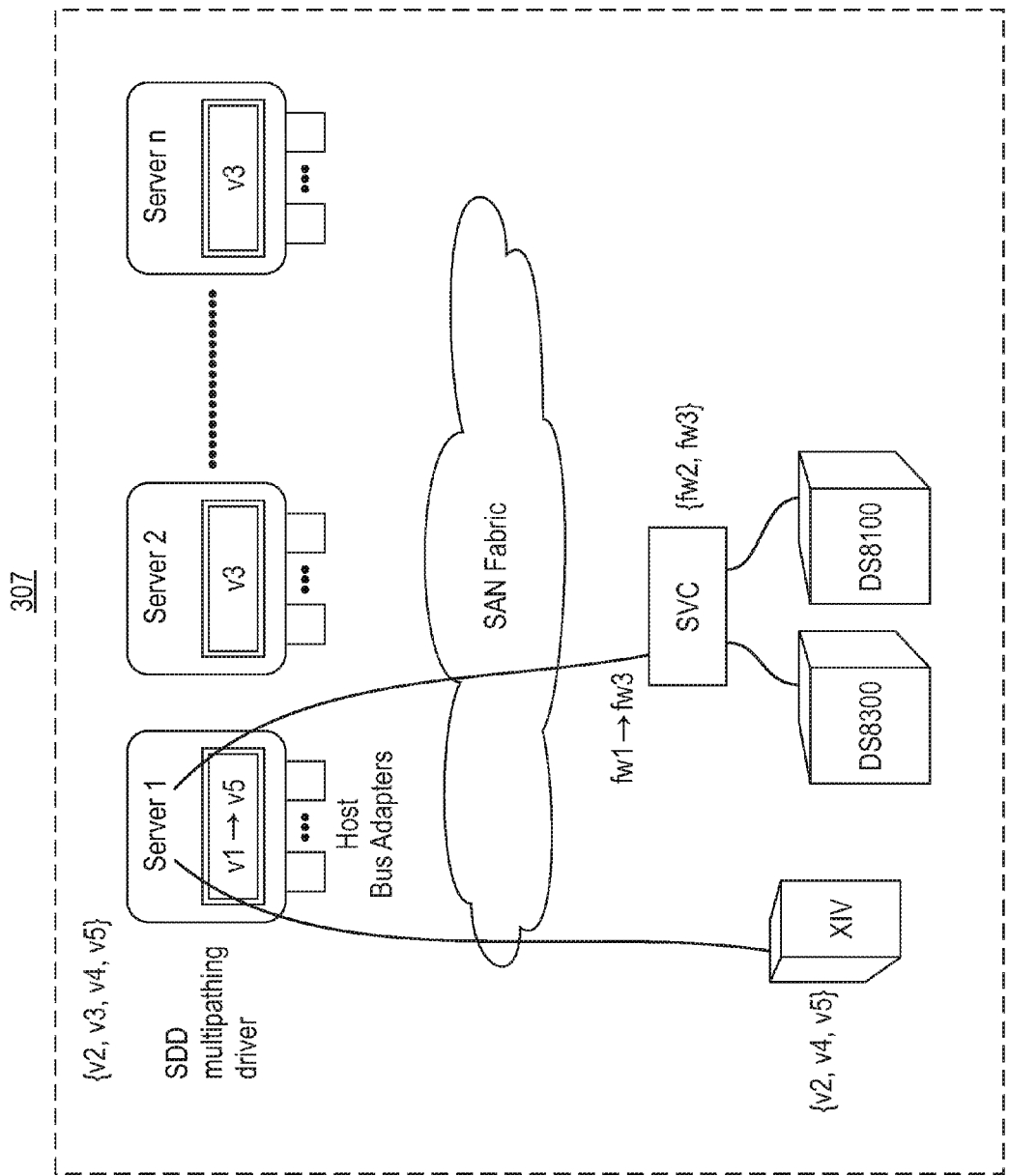
FIG. 3 schematically illustrates an upgrade scenario by way of working example.

In accordance with at least one embodiment of the invention, FIG. 3 schematically illustrates an upgrade scenario by way of working example, relative to a managed environment 307. As such, one manner of generating an upgrade plan is to form two sets of tuples, that is, primary and secondary upgrade tuples. First, the starting point is a device (referred to here as a Focus Device, or FD) that has old or dysfunctional firmware that needs to be changed. Using the CR, the next step is to identify Collateral Devices (CDs), representing devices that are related to the FD in some way (e.g., via physical connectivity, logical pairing, etc.). The FD and CDs collectively form the set of Connected Affected Entities (CAEs). Primary and secondary upgrade tuples are generated for this set, and include SCSI-like initiator and target components, with firmware levels of all components in the initiator and target path. If any of the firmware levels need to change, the choice of upgraded levels is included in this tuple. FIG. 4 provides an example of the upgrade path tuples that can be employed in the example of FIG. 3.

In accordance with at least one embodiment of the invention, having generated the upgrade path tuples, the UC determines a Change Window Duration (CWD) and then executes an algorithm (indicated at 531 in FIG. 5) for each peer pair of CAEs, starting with step 4 of algorithm 531.

In accordance with at least one embodiment of the invention, several unique steps are undertaken during a workflow. First, pairwise search space exploration is used to prune the overall search space, inasmuch as an attempt of handling failures in a global manner, with a large number of permutations and combinations, could make the search space intractable. The knowledge of incompatible firmware versions is used to prune the search space solely to advantageous components. Further, user input can be incorporated with respect to the maximum number of re-tries to attempt at each stage (Contingency Cut-Off Factor, CAFF) to avoid churning in place and thus eating up the remaining time window. Additionally, user input (either a priori or dynamically) can be incorporated to choose the relative priority of upgrade risk and upgrade time, and to alter the relative priority depending on the stage of the upgrade process. Further, matrix composition and path traversal can be used to quickly evaluate multiple options for choosing an optimum upgrade sequence after an upgrade failure.

In accordance with at least one embodiment of the invention, it can be appreciated that there may be cases where no prior history exists in a given context, e.g., when a new candidate firmware version is released. As such, as broadly contemplated herein, different viable routes are available. For instance, through user interaction, user input can be provided for inputting missing member values for the Historical Risk Matrix (HRM) and the Estimate Time Matrix (ETM).

Referring now to FIGS. 6A and 6B, an example HRM 6A and example ETM 6B is shown. The values identified within each matrix field may be gathered from a variety of sources. For example, the records stored in the KB may be used to populate the HRM and ETM, based on historical data or known variables. Additionally or alternatively, the data or missing members may be based on: user input based on personal experience or known values; estimation values based on lab testing in the field; vendor information based on empirical values from vendor experience and/or testing; conservative estimates (e.g., medium to high values for upgrade risk and upgrade time) and taking the maximum values of similar sized jumps of firmware versions.

Once the HRM and ETM are fully populated, incompatible versions may be eliminated based on data within the KB. For example, known CAE incompatibilities may exist, such as v3 at 610 being incompatible with an OS running on one ore more servers. Thus, an embodiment may remove the conflicting versions forming a new HRM and ETM such as that shown in FIGS. 7A and 7B. An embodiment may then, based on the available compatible version select the Destination Firmware Level (DFL) based on criteria including but not limited to: minimum steps, minimum time, and minimum risk. For example, an embodiment may combine the HRM and ETM via taking the product of the two values, thus determining an upgrade plan the favors both low risk and low time.

An embodiment may also weight the factors and combine them in a linear faction (e.g., sum the weighted portions) to modify the desired outcome. Additionally, these factors may be dynamically switched between prioritizing risk or time. By way of example, if HRM and ETM are weighted equally (e.g., $(a)*HRM+(b)*ETM=1$, thus the weighting factor $a=0.5$ and the weighting factor $b=0.5$), the following equations would be the result. Stepping through each version: $v1 \rightarrow v2 \rightarrow v4 \rightarrow v5$ would equate to $0.5(2+3+3)+0.5(2+1+2)=6.5$. Skipping step 2: $v1 \rightarrow v4 \rightarrow v5$ would equate to $0.5(4+3)+0.5(3.5+2)=6.25$. Skipping both step 2 and 4: $v1 \rightarrow v5$ would equate to $0.5(5)+0.5(4)=4.5$.

However, if the weighting factors are selected to favor HRM over ETM (e.g., $a=0.75$ and $b=0.25$) the following equations would be the result. Stepping through each version: $v1 \rightarrow v2 \rightarrow v4 \rightarrow v5$ would equate to $0.75(2+3+3)+0.25(2+1+2)=7.25$. Skipping version 2: $v1 \rightarrow v4 \rightarrow v5$ would equate to $0.75(4+3)+0.25(3.5+2)=6.625$. Skipping both version 2 and 4: $v1 \rightarrow v5$ would equate to $0.75(5)+0.25(4)=4.75$ Therefore, in both cases, v1 into v5 would be selected. However, as the process is carried out, an embodiment may monitor the progress against a Change Window Duration (CWD). For example, if an error occurs, or the time required is underestimated, the CWD may be reduced in size. An embodiment may then retry up to a number of times up to the Contingency Cut-off Factor (CAFF). Additionally, the weighting of the HRM and the ETM may be dynamically adjusted each time due to the CWD becoming smaller and smaller (e.g., more weight being placed on the ETM).

By way of example, if the weighting factors are selected to favor ETM over HRM (e.g., $a=0.1$ and $b=0.9$) the following equations would be the result. Stopping at version 4: $v1 \rightarrow v2 \rightarrow v4$ would equate to $0.1(2+3)+0.9(2+1)=3.2$. Skipping version 2 and stopping at version 4: $v1 \rightarrow v4$ would equate to $0.1(4)+0.9(3.5)=3.45$.

Thus, based on the calculated values, an embodiment would select $v1 \rightarrow v2 \rightarrow v4$. Alternatively, if the weighting factors were left as equal (e.g., $a=0.5$ and $b=0.5$) the corresponding results would be $v1 \rightarrow v2 \rightarrow v4=4$ and $v1 \rightarrow v4=3.75$, thus resulting in selection of $v1 \rightarrow v4$.

An embodiment may then update the KB with the determined time estimates to complete each successful step and data on which, if any, steps failed, thereby upgrading the risk profile of that particular step. In accordance with a general approach according to at least one embodiment of the invention, exhaustive contingency plans can be generated in advance based on these learned factors stored in the KB. This could involve computing and providing detailed guidance for failure recovery at every step of the process. Alternatively, contingency plans could be generated for the next 'n' steps. Here, the user starts applying these steps, and returns to a process as contemplated herein after finishing 'm' (m<=n) steps. This forces deterministic guidance back into a process as contemplated herein, and also limits the amount of exhaustive a priori planning.

It can be appreciated from the foregoing that, in accordance with at least one embodiment of invention, a technical improvement is represented at least via provision methods and arrangements for computing a firmware upgrade plan that takes into account upgrade failures, comprising: dynamically computing one or more contingency upgrade plans when failures occur while in the middle of an upgrade plan of a particular system, under change window time constraints; and in light of the computed plans, recommending a plan that makes forward progress in the system even if the desired eventual firmware state is not attainable in light of a change window time that may remain in a failure scenario.

In accordance with at least one embodiment of the invention, very generally, quantitative values as determined herein, or other data or information as used or created herein, can be stored in memory or displayed to a user on a screen, as might fit the needs of one or more users.

Figure 8:
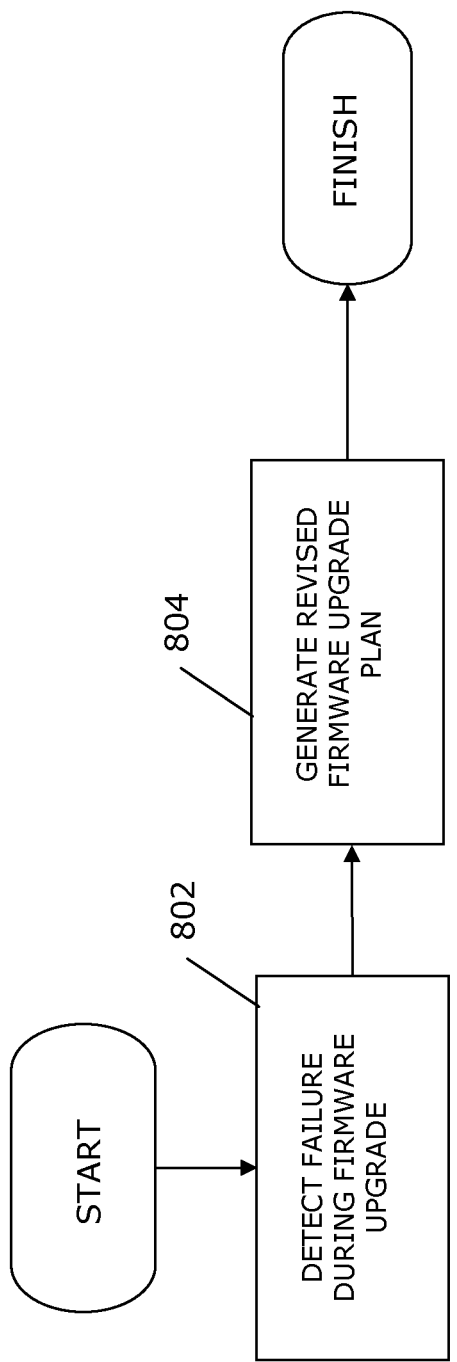
FIG. 8 sets forth a process more generally for determining a firmware upgrade plan for one or more devices

FIG. 8 sets forth a process more generally for determining a firmware upgrade plan for one or more devices, in accordance with at least one embodiment of the invention. It should be appreciated that a process, such as that broadly illustrated in FIG. 5, can be carried out on essentially any suitable computer system or set of computer systems, which may, by way of an illustrative and non-restrictive example, include a system such as that indicated at 12' in FIG. 9. In accordance with an example embodiment, most if not all of the process steps discussed with respect to FIG. 6 can be performed by way of a processing unit or units and system memory such as those indicated, respectively, at 16' and 28' in FIG. 9.

As shown in FIG. 8, in accordance with at least one embodiment of the invention, a failure is detected during a firmware upgrade, wherein the firmware upgrade is associated with a predetermined change window (802). Upon the detecting, a revised firmware upgrade plan is generated which prescribes further progress in the firmware upgrade to a degree attainable in a remaining time of the change window (804).

Figure 9:
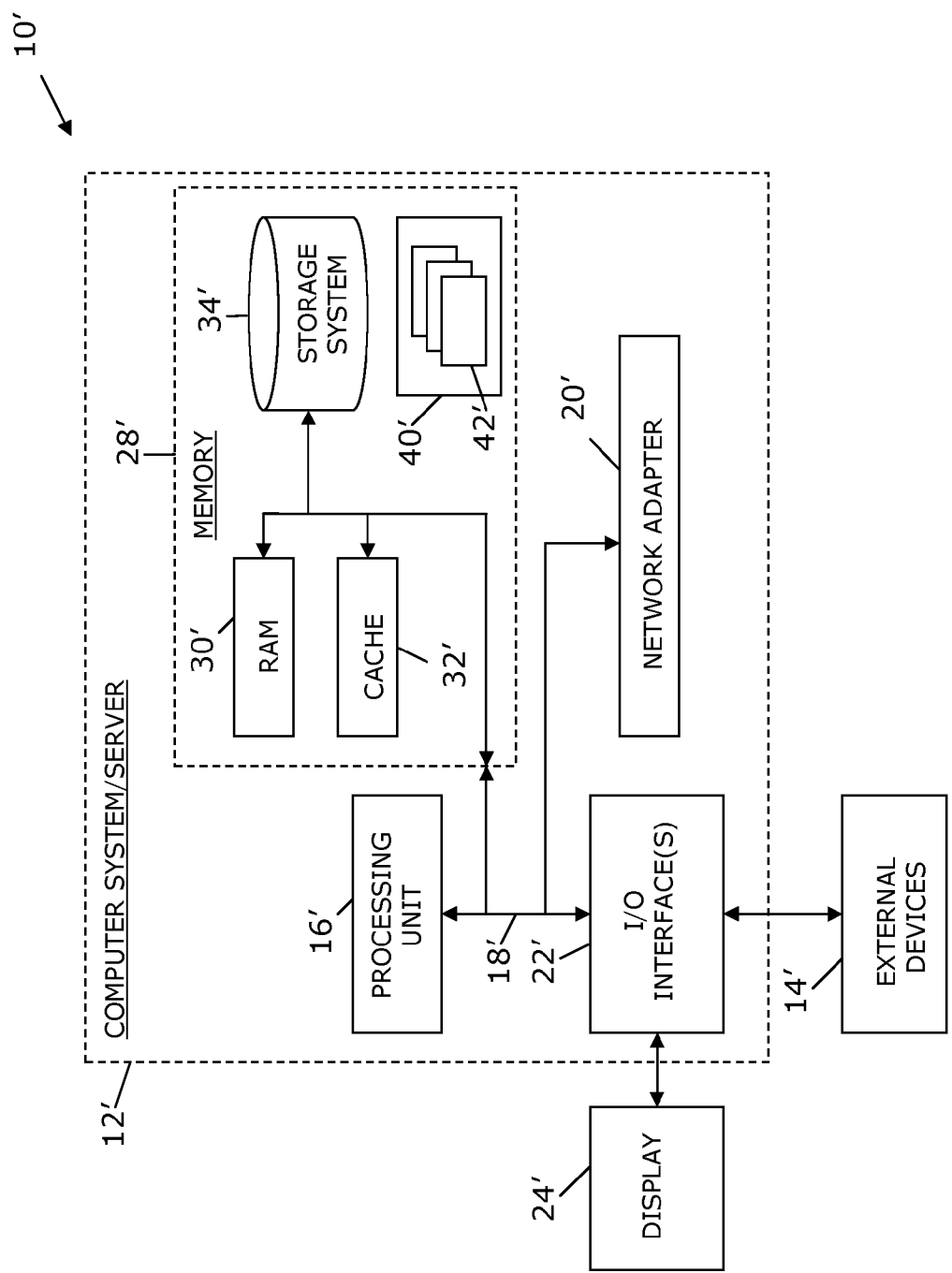
FIG. 9 illustrates a computer system.

Referring now to FIG. 9, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining a revised firmware upgrade plan for one or more devices, said method comprising:
   utilizing at least one processor to execute computer code that performs the steps of:
   selecting, in view of a predetermined change window and risk associated with the firmware upgrade plan, a firmware upgrade plan having a starting state, wherein the risk associated with the firmware upgrade plan identifies a probability that at least a portion of the firmware upgrade plan will fail during implementation of the firmware upgrade plan;
   detecting a failure during execution of the firmware upgrade plan;
   responsive to the detecting, identifying a revised firmware upgrade plan based on time remaining in the predetermined change window and risk associated with the revised firmware upgrade plan, wherein the revised firmware upgrade plan comprises contingency plans in the event of a failure of at least one step of the revised firmware upgrade plan and wherein the revised firmware upgrade plan is based upon a possible recovery plan, end-of-service devices associated with the firmware upgrade plan, and advancing the firmware upgrade from the starting state;
   wherein the contingency plans are generated by prioritizing upgrade risk and upgrade time using a historical risk matrix identifying values for an upgrade risk and an estimate time matrix identifying values for an upgrade time, the values identified at least in part from executed plans having attributes similar to the contingency plan and wherein the prioritization is dynamically computed at different times during the performance of an upgrade; and executing the revised firmware upgrade plan.

2. The method according to claim 1, wherein the revised firmware upgrade plan comprises at least one firmware action; and said identifying comprises:

determining risk associated with a plurality of potential firmware upgrade actions; and determining an estimated time for the plurality of potential firmware upgrade actions.

3. The method according to claim 2, wherein the determined risk and the determined estimated time are based on historical data.

4. The method according to claim 2, wherein the determined risk and the determined estimated time are weighted.

5. The method according to claim 4, wherein the weights are determined dynamically.

6. The method according to claim 5, wherein the weights change dynamically at one or more predetermined timepoints; and wherein the one or more predetermined timepoints are selected from the group consisting of: a timepoint prior to starting the firmware upgrade and a timepoint corresponding to detection of the failure.

7. The method according to claim 2, wherein said identifying is based on a linear combination of the determined risk and the determined estimated time.

8. The method according to claim 2, wherein said identifying is based on a product of the determined risk and the determined estimated time.

9. The method according to claim 2, wherein said determining risk is based on one or more of:

firmware associated with the firmware upgrade plan, the firmware being at an end-of-support point;

one or more devices associated with the firmware upgrade plan, the devices being at end-of-life point; and one or more potential states of the firmware comprising a state of no return.

10. An apparatus for determining a revised firmware upgrade plan for one or more devices, said apparatus comprising:

at least one processor; and a computer readable storage medium having computer readable program code embodied therewith and executable by the at least one processor, the computer readable program code comprising:

computer readable program code configured to select a firmware upgrade plan, in view of a predetermined change window and risk associated with the firmware upgrade plan having a starting state, wherein the risk associated with the firmware upgrade plan identifies a probability that at least a portion of the firmware upgrade plan will fail during implementation of the firmware upgrade plan;

computer readable program code configured to detect a failure during execution of the firmware upgrade plan;

computer readable program code configured to be responsive to the detecting, identify a revised firmware upgrade plan based on time remaining in the predetermined change window and risk associated with the revised firmware upgrade plan, wherein the revised firmware upgrade plan comprises contingency plans in the event of a failure of at least one step of the revised firmware upgrade plan and wherein the revised firmware upgrade plan is based upon a possible recovery plan, end-of-service devices associated with the firmware upgrade plan, and advancing the firmware upgrade from the starting state;

wherein the contingency plans are generated by prioritizing upgrade risk and upgrade time using a historical risk matrix identifying values for an upgrade risk and an estimate time matrix identifying values for an upgrade time, the values identified at least in part from executed plans having attributes similar to the contingency plan and wherein the prioritization is dynamically computed at different times during the performance of an upgrade; and computer readable program code configured to execute the revised firmware upgrade plan.

11. A computer program product for a revised firmware upgrade plan for one or more devices, said computer program product comprising:

a computer readable storage medium having computer readable program code embodied therewith, the computer readable program code comprising:

computer readable program code configured to select a firmware upgrade plan, in view of a predetermined change window and risk associated with the firmware upgrade plan having a starting state, wherein the risk associated with the firmware upgrade plan identifies a probability that at least a portion of the firmware upgrade plan will fail during implementation of the firmware upgrade plan;

computer readable program code configured to detect a failure during execution of the firmware upgrade plan;

computer readable program code configured to be responsive to the detecting, that identifies a revised firmware upgrade plan based on a time remaining of the predetermined change window and risk associated with the revised firmware upgrade plan, wherein the revised firmware upgrade plan comprises contingency plans in the event of a failure of at least one step of the revised firmware upgrade plan and wherein the revised firmware upgrade plan is based upon a possible recovery plan, end-of-service devices associated with the firmware upgrade plan, and advancing the firmware upgrade from the starting state;

wherein the contingency plans are generated by prioritizing upgrade risk and upgrade time using a historical risk matrix identifying values for an upgrade risk and an estimate time matrix identifying values for an upgrade time, the values identified at least in part from executed plans having attributes similar to the contingency plan and wherein the prioritization is dynamically computed at different times during the performance of an upgrade; and computer readable program code configured to execute the revised firmware upgrade plan.

12. The computer program product according to claim 11, wherein the revised firmware upgrade plan comprises at least one firmware action; and said identifying comprises:

computer readable program code configured to determine risk associated with a plurality of potential firmware upgrade actions; and computer readable program code configured to determine an estimated time for the plurality of potential firmware upgrade actions.

13. The computer program product according to claim 12, wherein the determined risk and the determined estimated time are based on historical data.

14. The computer program product according to claim 12, wherein the determined risk and the determined estimated time are weighted.

15. The computer program product according to claim 14, wherein the weights are determined dynamically.

16. The computer program product according to claim 15, wherein the weights change dynamically at one or more predetermined timepoints; and
   wherein the one or more predetermined timepoints are selected from the group consisting of: a timepoint prior to starting the firmware upgrade and a time point corresponding to detection of the failure.

17. The computer program product according to claim 12, wherein said identifying is based on a linear combination of the determined risk and the determined estimated time.

18. The computer program product according to claim 12, wherein said identifying is based on a product of the determined risk and the determined estimated time.

19. The computer program product according to claim 12, wherein said determining risk is based on one or more of:
   firmware associated with the firmware upgrade plan, the firmware being at an end-of-support point;
   one or more devices associated with the firmware upgrade plan, the devices being at end-of-life point; and
   one or more potential states of the firmware comprising a state of no return.

20. A method for computing a firmware upgrade plan that takes into account upgrade failures, comprising:
   dynamically computing at least one contingency plan when failures of a firmware upgrade plan having a starting state occur, while performing a desired upgrade plan of a particular system under change window time constraints; and
   in light of the computed plans, recommending a plan that makes forward progress in said particular system even if the desired upgrade plan is unattainable in light of change window time remaining, in a failure scenario;
   wherein the at least one contingency plan is generated employing a family of algorithms that provide a spectrum of prioritization based upon weightings between historical estimates of upgrade action risk and upgrade time stored in a historical risk matrix and an estimate time matrix and identified at least on part from executed plans having attributes similar to the contingency plan, wherein the at least one contingency plan is based upon a possible recovery plan, end-of-service devices associated with the at least one contingency plan, and advancing the upgrade from the starting state;
   wherein a particular weighting between risk and upgrade time can dynamically change at one or more of: (i) prior to starting the desired upgrade plan and (ii) when computing the at least one contingency plan, in the failure scenario; and
   wherein the spectrum of prioritization is determined using one of: a linear combination of risk and time estimates and a product of risk and time estimates; and
   executing the at least one contingency plan.

21. A method for computing a firmware upgrade plan that analyzes feasible solutions, historical risk, and time estimates of similar upgrades, comprising:
   identifying a proposed firmware update to a target device, wherein the proposed firmware update is to be installed during a predetermined change window;
   determining a degree of risk of performing the identified firmware update during the predetermined window, wherein the degree of risk is determined based upon at least one of: (i) firmware of the target device being at end of support, (ii) the target device being at end-of-life, and (iii) intermediate firmware states being states of no return;
   identifying a revised firmware update to decrease the degree of risk associated with performing the update, wherein the revised firmware update comprises contingency plans in the event of a failure of at least one step of the revised firmware update and wherein the revised firmware update plan is based upon a possible recovery plan, end-of-service devices associated with the firmware update, and advancing the firmware update from the starting state;
   wherein the contingency plans are generated by prioritizing upgrade risk and upgrade time using a historical risk matrix identifying values for an upgrade risk and an estimate time matrix identifying values for an upgrade time, the values identified at least in part from executed plans having attributes similar to the contingency plan and wherein the prioritization is dynamically computed at different times during the performance of an upgrade;
   in light of the determining and identifying, recommending to a user an upgrade strategy selected from the group consisting of: (i) upgrade device in place using either the proposed firmware update or the revised firmware update, (ii) replicate data, then upgrade device using either the proposed firmware update or the revised firmware update, and (iii) replicate data, then replace device; and
   performing an execution of the upgrade strategy selected by the user responsive to the recommending.

* * * * *